(12) United States Patent  
Shimizu et al.

(10) Patent No.: US 9,411,081 B2  
(45) Date of Patent: Aug. 9, 2016

(54) METHOD OF MANUFACTURING POLARIZING PLATE

(75) Inventors: Takashi Shimizu, Ibaraki (JP); Takashi Kamijo, Ibaraki (JP); Hitoshi Kitagishi, Ibaraki (JP); Minoru Miyatake, Ibaraki (JP); Shusaku Goto, Ibaraki (JP); Takeharu Kitagawa, Ibaraki (JP); Tomohiro Mori, Ibaraki (JP); Nobuyuki Haida, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 496 days.

(21) Appl. No.: 13/991,278

(22) PCT Filed: Dec. 1, 2011

(86) PCT No.: PCT/JP2011/077820  
§ 371 (c)(1),  
(2), (4) Date: Jun. 3, 2013

(87) PCT Pub. No.: WO2012/074063  
PCT Pub. Date: Jun. 7, 2012

(65) Prior Publication Data  
US 2013/0249129 A1  Sep. 26, 2013

(30) Foreign Application Priority Data

Dec. 2, 2010 (JP) ................. 2010-269658  
May 31, 2011 (JP) ................. 2011-122663

(51) Int. Cl.  
*G02B 5/30* (2006.01)  
*B29C 55/04* (2006.01)  
(Continued)

(52) U.S. Cl.  
CPC ............... *G02B 5/30* (2013.01); *B29C 55/023* (2013.01); *B29C 55/04* (2013.01); *G02B 5/305* (2013.01);  
(Continued)

(58) Field of Classification Search  
CPC ........ G02B 5/30; G02B 5/305; G02B 5/3041; B29C 55/02; B29C 55/023; B29C 55/026; B29C 55/04; B29C 55/06; B29C 55/065  
USPC ................. 264/1.24, 1.31, 1.34, 1.7, 2.7  
See application file for complete search history.

(56) References Cited

U.S. PATENT DOCUMENTS 4,356,523 A  10/1982  Yeh  
4,659,523 A   4/1987  Rogers et al.  
(Continued)

FOREIGN PATENT DOCUMENTS

CN  101808806 B  1/2014  
EP  2 405 288 A1  1/2012  
(Continued)

OTHER PUBLICATIONS

International Search Report for PCT/JP2011/077820, mailing date of Feb. 28, 2012.  
(Continued)

*Primary Examiner* — Alison L Hindenlang  
*Assistant Examiner* — Lawrence D Hohenbrink, Jr.  
(74) *Attorney, Agent, or Firm* — Westerman, Hattori, Daniels & Adrian, LLP (57) ABSTRACT

The present invention provides a method of manufacturing a polarizing plate having sufficient heat resistance, without deteriorating the dye-affinity and the like of the polarizing film and without the necessity of transferring or detaching the polarizing film. Provided is a method of manufacturing a polarizing plate (10) that includes a polyester resin base (11) and a polarizing film including a polyvinyl alcohol resin laminated on the polyester resin base. The method includes the steps of: stretching a laminate that includes a polyvinyl alcohol resin layer (12) laminated on the polyester resin base (11); dyeing the polyvinyl alcohol resin layer (12); and crystallizing the polyester resin base (11). The crystallization step is performed after the dyeing step.

15 Claims, 1 Drawing Sheet

(51) Int. Cl.
  *B29C 55/02* (2006.01)
  *B29K 29/00* (2006.01)
  *B29K 67/00* (2006.01)

(52) U.S. Cl.
  CPC ............ *G02B 5/3041* (2013.01); *B29C 55/026* (2013.01); *B29K 2029/04* (2013.01); *B29K 2067/00* (2013.01)

(56) References Cited

U.S. PATENT DOCUMENTS

| | | | | |
|---|---|---|---|---|
| 4,895,769 | A * | 1/1990 | Land | G02B 1/08 264/1.34 |
| 2007/0128461 | A1 | 6/2007 | Tsai | |
| 2010/0239837 | A1* | 9/2010 | Hagiwara | B29C 47/0021 428/220 |
| 2011/0315306 | A1 | 12/2011 | Goto et al. | |
| 2012/0055623 | A1* | 3/2012 | Kitagawa | B29C 55/023 156/229 |
| 2012/0327512 | A1 | 12/2012 | Goto et al. | |

FOREIGN PATENT DOCUMENTS

| | | |
|---|---|---|
| EP | 2 518 542 A1 | 10/2013 |
| JP | 2001-343521 A | 12/2001 |
| JP | 2001-343522 A | 12/2001 |
| JP | 2003-043257 A | 2/2003 |
| JP | 2008-26637 A | 2/2008 |
| JP | 2010-204622 A | 9/2010 |
| TW | 200722285 A | 6/2007 |
| WO | 2010/100917 A1 | 9/2010 |

OTHER PUBLICATIONS

Fu S. et al., "Research on Dichroism and Manufacture of Colored Polarizing Plates", Physical Experiments, Feb. 1987, vol. 7, No. 1, pp. 27-28, with English translation, Cited in CN Office Action dated Jan. 22, 2015.

Office Action dated Jan. 25, 2016, issued in counterpart Taiwanese Patent Application No. 100144158, with partial English translation (8 pages).

* cited by examiner

METHOD OF MANUFACTURING POLARIZING PLATE

TECHNICAL FIELD

The present invention relates to a method of manufacturing a polarizing plate.

BACKGROUND ART

In a liquid crystal display, a polarizing plate including a polarizing film is used. As a method of manufacturing the polarizing plate, a method is disclosed in which, for example, a polyvinyl alcohol (PVA) film is formed on a polyethylene terephthalate (PET) base, the PVA film is then stretched together with the base, and thereafter, the PVA film is dyed (see Patent Document 1, for example). Another method also is disclosed in which a PVA film is formed on a PET base as in the above method, and after the thus-obtained laminate is stretched, the PET base is crystallized, and thereafter, the PVA film is dyed (see Patent Document 2, for example). Also, still another method is disclosed in which a PVA film is formed on a PET base as in the above methods, and after the thus-obtained laminate is stretched and the PVA film is dyed, the PVA film is transferred to another base and the PET base is detached (see Patent Document 3, for example).

CITATION LIST

Patent Document(s)

Patent Document 1: U.S. Pat. No. 4,895,769
Patent Document 2: U.S. Pat. No. 4,659,523
Patent Document 3: JP 2001-343521 A

BRIEF SUMMARY OF THE INVENTION

Problem to be Solved by the Invention

However, in the polarizing plate manufactured by the method described in Patent Document 1, the stretched PET base does not exhibit sufficient heat resistance when it is used as a protective layer for a polarizing film as it is. Thus, owing to heating or the like, the size of the PET base may be changed significantly. Accordingly, in a durability test, problems may occur such that the PET base shrinks and the polarizing plate is partially separated from a liquid crystal cell. In the polarizing plate manufactured by the method described in Patent Document 2, the heat resistance etc. of the PET base can be improved by the crystallization of the base. However, when the crystallization treatment is performed before dyeing the PVA film, not only PET but also PVA is crystallized at the same time, resulting in deterioration of the dye-affinity of PVA. Accordingly, a dichroic dye such as iodine needs to be present at a high concentration during the dyeing treatment, and besides, the dyeing treatment takes a long time. This causes a problem of reduced productivity. In the polarizing plate manufactured by the method described in Patent Document 3, the polarizing film can be transferred to a base having heat resistance. This, however, causes the necessity of removing the stretched PET base, and also the necessity of providing another base on which the PVA film is to be transferred. Accordingly, the method described in Patent Document 3 is not preferable in terms of productivity.

With the foregoing in mind, it is one object of the present invention to provide a method of manufacturing a polarizing plate having sufficient heat resistance without deteriorating dye-affinity and the like of the polarizing film and without the necessity of transferring or detaching the polarizing film.

Means for Solving Problem

In order to achieve the above object and others, the present invention provides a method of manufacturing a polarizing plate that includes a polyester resin base and a polarizing film including a polyvinyl alcohol resin laminated on the polyester resin base. The method includes the steps of: stretching a laminate that includes a polyvinyl alcohol resin layer laminated on the polyester resin base; dyeing the polyvinyl alcohol resin layer; and crystallizing the polyester resin base, wherein the crystallization step is performed after the dyeing step.

Effects of the Invention

According to the present invention, it is possible to provide a method of manufacturing a polarizing plate having sufficient heat resistance without deteriorating dye-affinity and the like of the polarizing film and without the necessity of transferring or detaching the polarizing film.

MODE FOR CARRYING OUT THE INVENTION

In the manufacturing method of the present invention, it is preferable that, in the stretching step, the polyester resin base is stretched until the following orientation property $\Delta n$ becomes 0.03 or more. As the degree of orientation increases, the tension to be applied to the polyester resin base during the stretching becomes greater, so that it may be difficult to stretch the base stably. Thus, the upper limit of the $\Delta n$ is 0.25, for example.

$$\Delta n = nx - ny$$

nx: the refractive index in a direction in which a refractive index within a plane of the polyester resin base reaches its maximum ny: the refractive index in a direction orthogonal to the direction of the nx within the plane of the polyester resin base In the manufacturing method of the present invention, it is preferable that, in the crystallization step, the crystallization is performed so that the degree of crystallinity of the polyester resin base, represented as the heat of fusion determined by differential scanning calorimetry (DSC), is in the range from 25 to 45 mJ/mg. It is more preferable that the crystallization is performed so that the degree of crystallinity is in the range from 25 to 40 mJ/mg.

In the manufacturing method of the present invention, it is preferable that, in the crystallization step, the crystallization is performed at a temperature higher than the glass transition temperature (Tg) of the polyester resin base. It is particularly preferable that the crystallization is performed at a temperature in the range from 80° C. to 120° C. It is to be noted, however, that, in the present invention, the temperature for crystallizing the polyester resin base is not limited thereto as long as the crystallization is performed at a temperature higher than Tg of the polyester resin base. In the manufacturing method of the present invention, the crystallization treatment temperature in the crystallization step is in the range from, for example, 70° C. to 200° C., preferably 75° C. to 180° C., and more preferably 80° C. to 150° C.

In the manufacturing method of the present invention, it is preferable that, in the crystallization step, the crystallization is performed so that the polyester resin base has a haze value of 1% or less.

In the manufacturing method of the present invention, it is preferable that the polyester resin base includes a polyethylene terephthalate resin or a copolymer thereof.

Next, the method of manufacturing a polarizing plate according to the present invention will be described below with reference to an illustrative example. As described above, the manufacturing method of the present invention includes the following series of steps: the stretching step, the dyeing step, and the crystallization step. The manufacturing method may further include a lamination step to be described below. It is to be noted, however, that the lamination step is an optional step, and instead of self-producing a laminate including a polyvinyl alcohol resin layer and a polyester base by the following lamination step, a commercially available laminate with the same configuration may be used.

(1) Lamination Step

First, a polyvinyl alcohol resin layer is formed on a polyester resin base.

The polyester resin base may be formed using, for example: polyethylene terephthalate (PET); polybutylene terephthalate (PBT); polyethylene naphthalate (PEN); isophthalic acid; a copolymerized PET (PET-G) containing, e.g., an alicyclic dicarboxylic acid with a cyclohexane ring or the like or alicyclic diol; any of other polyesters; or a copolymer or a blend thereof.

Preferably, the polyester resin base is formed using PET or a copolymerized PET. In order to improve the polarization property of the polyvinyl alcohol resin, it is preferable to stretch the polyvinyl alcohol resin at a high stretch ratio of at least 4 times. The polyester resin base formed using PET can withstand stretching at such a high stretch ratio. Also, by using PET, it is possible to provide the polyester resin base that is amorphous and exhibits excellent stretchability suitable for stretching at a high stretch ratio when it is in an unstretched state, and acquires heat resistance after it is stretched and crystallized by heating. Furthermore, by forming the polyester resin base using PET, it is possible to ensure that the polyester resin base in an unstretched state has sufficient heat resistance to withstand the application and drying of the polyvinyl alcohol resin.

Examples of the polyvinyl alcohol resin used for forming the polyvinyl alcohol resin layer include: polyvinyl alcohols (PVAs); partially formalized PVAs; and ethylene-containing polyvinyl alcohols. The polarization degree of the polyvinyl alcohol resin is not particularly limited, and preferably is 2000 or more. The saponification degree of the polyvinyl alcohol resin is not particularly limited, and preferably is 90 mol % or more. By setting the saponification degree to 90 mol % or more, it is possible to obtain a polarizing plate with superior durability. As the polyvinyl alcohol resin, a commercially available product may be used, for example. Examples of the commercially available product include: "JC40 (trade name)" manufactured by JAPAN VAM & POVAL CO., LTD.; "POVAL PVA 124 (trade name)" manufactured by Kuraray Co., Ltd.; and "GOHSENOL NH-18 (trade name)" manufactured by The Nippon Synthetic Chemical Industry Co., Ltd.

The polyvinyl alcohol resin layer can be formed by applying a solution containing the polyvinyl alcohol resin onto the polyester resin base and then drying the solution, for example. A solvent of the solution is not particularly limited, and may be water, alcohol, dimethyl sulfoxide (DMSO), or the like, for example. As the method of applying the solution, any appropriate method can be employed. Examples of the method include spin coating, roller coating, flow coating, clip coating, and bar coating. The application temperature preferably is equal to or lower than the glass transition temperature (Tg) of the polyester resin base. The drying is not particularly limited, and can be, for example, natural drying, air drying, heat drying, or the like. In the case of heat drying, the drying temperature preferably is in the range from 50° C. to 75° C., more preferably from 60° C. to 70° C. The thickness of the polyvinyl alcohol resin layer after the drying is not particularly limited, and preferably is 20 μm or less, more preferably from 3 to 20 μm.

(2) Stretching Step

The laminate obtained by forming the polyvinyl alcohol resin layer on the polyester resin base is stretched. The stretching of the laminate may be performed either in a single step or in a plurality of steps. When the stretching is performed in a plurality of steps, the stretch ratio (maximum stretch ratio) of the laminate in the following description refers to the product obtained by multiplying the stretch ratios in the respective steps.

The stretching treatment may be carried out either in the air (such stretching also may be referred to as "aerial stretching" hereinafter) or in water (such stretching also may be referred to as "underwater stretching" hereinafter) (these stretching methods are described in WO 2010/100917, for example). The stretching treatment can be carried out using any appropriate stretching machine such as a roller stretching machine or a tenter stretching machine, for example. In the case of aerial stretching, the stretching temperature is in the range from, for example, 75° C. to 150° C., preferably 80° C. to 150° C., and more preferably 90° C. to 130° C. In the case of underwater stretching, the stretching temperature preferably is 85° C. or lower, more preferably in the range from 40° C. to 85° C. When the stretching temperature is higher than 85° C., problems may occur, for example: the polyvinyl alcohol resin may be eluted in water; and in the case where the dyeing step to be described below is performed before the stretching step, a dichroic substance, such as iodine, adsorbed on the polyvinyl alcohol resin may be eluted in water. This may cause the optical characteristics of the resultant thin polarizing film to be deteriorated significantly, particularly in the case where the polyvinyl alcohol resin layer is thin (when the polarizing film to be obtained is thin). It is more preferable that the stretching temperature is 65° C. or lower, because the underwater stretching can be carried out favorably in this temperature range, thereby allowing the resultant polarizing film to have superior optical characteristics (such as a contrast ratio of the polarizing film).

The stretching treatment preferably is underwater stretching. According to the underwater stretching, a higher degree of orientation of the polyester resin can be achieved in the stretching step, as compared with the aerial stretching. With a high degree of orientation, the polyester resin can be crystallized in a short time in the crystallization step.

In the case where underwater stretching is employed, it is preferable to stretch the laminate while immersing the laminate in a stretching bath containing a boric acid aqueous solution (boric acid underwater stretching). By using a boric acid aqueous solution as a solution in the stretching bath, it is possible to impart, to the polyvinyl alcohol resin layer, rigidity sufficient to withstand the tension to be applied during the stretching, as well as water resistance sufficient to prevent the polyvinyl alcohol resin layer from dissolving in water. Specifically, in the aqueous solution, boric acid generates tetrahydroxyborate anion, which can cross-link with the polyvinyl alcohol resin via hydrogen bonding. As a result, rigidity and water resistance can be imparted to the polyvinyl alcohol resin layer, so that the polyvinyl alcohol resin layer can be stretched favorably. This allows a polarizing film with excellent optical characteristics to be manufactured.

The boric acid aqueous solution preferably is obtained by dissolving at least one compound selected from boric acid and borates in water as a solvent. The concentration of boric acid preferably is 1 to 10 parts by weight with respect to 100 parts by weight of water. By setting the concentration of boric acid to at least 1 part by weight, it is possible to effectively prevent the polyvinyl alcohol resin layer from dissolving, thus allowing a polarizing film with superior characteristics to be manufactured. Instead of the solution of boric acid or borate, it is possible to use an aqueous solution or the like obtained by dissolving a boron compound (such as borax), glyoxal, glutaraldehyde, or the like in a solvent, for example.

When the boric acid underwater stretching is performed after a dyeing step to be described below, iodide preferably is added to the stretching bath (the boric acid aqueous solution). By adding iodide, it is possible to prevent iodine adsorbed on the polyvinyl alcohol resin layer from being eluted. Specific examples of iodide will be described below. The concentration of iodide preferably is 0.05 to 15 parts by weight, more preferably 0.5 to 8 parts by weight with respect to 100 parts by weight of water.

The time period for immersing the laminate in the stretching bath preferably is from 15 seconds to 5 minutes, more preferably from 15 seconds to 2 minutes.

When the stretching of the laminate is performed in a plurality of steps, for example, the step of subjecting the laminate to aerial stretching at a high temperature and the step of subjecting the laminate to boric acid underwater stretching may be performed in combination. In particular, it is preferable to perform the aerial stretching step, the dyeing step, and the boric acid underwater stretching step in this order. In these series of steps, the aerial stretching step can be ranked as means preliminary or auxiliary to the boric acid underwater stretching. Thus, hereinafter, this aerial stretching also is referred to as "aerial auxiliary stretching". The stretch ratio by the aerial auxiliary stretching preferably is 3.5 times or smaller. The stretching temperature in the aerial auxiliary stretching preferably is equal to or higher than the glass transition temperature of the polyvinyl alcohol resin, more preferably in the range from 95° C. to 150° C.

There are two advantageous effects brought about by performing the aerial auxiliary stretching. The first effect is, by performing the aerial auxiliary stretching, the laminate can be stretched at a higher stretch ratio as compared with the case where the laminate is subjected only to the boric acid underwater stretching. As a result, it is possible to manufacture a thin polarizing film with excellent optical characteristics (such as a polarization degree). When the polyester resin base is formed using PET, for example, aerial stretching at a high temperature can suppress the orientation of the polyester resin base more effectively than the underwater stretching. If the orientation of the base is promoted too much, the tension to be applied to the base during the stretching becomes too great, so that the base may not be stretched stably or the base may be fractured. Accordingly, the laminate can be stretched at a higher stretch ratio when the laminate is stretched while suppressing the orientation of the base to fall within a particular range. On this account, as compared to the case where the laminate is subjected only to the boric acid underwater stretching, the laminate can be stretched at a higher stretch ratio when it is subjected to the aerial auxiliary stretching and the boric acid underwater stretching in combination, because, by performing the aerial auxiliary stretching and the boric acid underwater stretching in combination, the laminate can be stretched while suppressing the orientation of the base to fall within a particular range.

The second effect brought about by performing the aerial auxiliary stretching is that the orientation property of the polyvinyl alcohol resin is improved by the aerial auxiliary stretching, which allows the polyvinyl alcohol resin to have an improved orientation property even after the boric acid underwater stretching. As a result, it is possible to manufacture a thin polarizing film with excellent optical characteristics (such as a polarization degree). It is presumed that this effect is obtained through the following mechanism. If the orientation property of the polyvinyl alcohol resin is improved in advance by the aerial auxiliary stretching before performing the boric acid underwater stretching, boric acid can cross-link with the polyvinyl alcohol resin more easily when the laminate is immersed in a boric acid aqueous solution. Thus, the laminate is stretched with the boric acid serving as joints. As a result, the orientation property of the polyvinyl alcohol resin is high even after the boric acid underwater stretching. It is to be noted, however, that the present invention is by no means limited by this presumption.

The stretch ratio in this step preferably is at least 4 times, more preferably at least 4.5 times with respect to the original length of the laminate. Also, it is preferable that the stretch ratio is 6.5 times or less. When the stretch ratio is less than 4 times, a dichroic substance is not oriented sufficiently, so that the optical characteristics of the resultant polarizing film become low. In the present invention, when the stretch ratio is more than 6.5 times, the laminate may become liable to fracture, so that stable manufacturing of a polarizing film may be difficult.

As described above, in the present step, the polyester resin base preferably is stretched until the Δn becomes 0.03 or more. By making the Δn large, for example, in the case where the crystallization step is performed after the present step, it is possible to cause the polyester resin to form small crystals, thus lowering the haze value of the polyester resin base. Also, because the crystallization speed of the polyester resin is accelerated, the polyester resin base can be crystallized at a low temperature of about 80° C. to 120, for example. When the Δn is too large, the tension to be applied during the stretching becomes too great, so that stable stretching of the base may be difficult or the base may be fractured. Thus, it is preferable that the Δn is 0.25 or less.

(3) Dyeing Step

The polyvinyl alcohol resin layer is dyed. The dyeing treatment can be carried out by, for example, immersing the polyester resin base and the polyvinyl alcohol resin layer in a dyeing solution containing a dichroic substance.

As the dichroic substance, it is possible to use a conventionally known substance, which may be iodine, an organic dye, or the like, for example. When the organic dye is used as the dichroic substance, it is preferable to used two or more kinds of organic dyes in combination for neutralization of the visible light region, for example.

As the dyeing solution, it is possible to use a solution obtained by dissolving the dichroic substance in a solvent. The solvent may be, for example, water, which optionally may further contain an organic solvent(s) compatible to water. The concentration of the dichroic substance in the solution is not particularly limited, and is in the range from, for example, 0.01 to 2 wt %, preferably from 0.05 to 1 wt %.

When iodine is used as the dichroic substance, it is preferable that the dyeing solution further contain iodide as an auxiliary in addition to iodine, because it allows the solubility, the dyeing efficiency, etc. to be further improved. Example of the iodide include potassium iodide, lithium iodide, sodium iodide, zinc iodide, aluminum iodide, lead iodide, copper iodide, barium iodide, calcium iodide, tin iodide, and titanium iodide. The content of any of these iodides in the dyeing solution preferably is in the range from 0.05 to 10 wt %, more preferably from 0.10 to 5 wt %.

When iodine and potassium iodide are used in combination, for example, the ratio (A:B (weight ratio)) between iodine (A) and potassium iodide (B) in the solution is in the range from, for example, A:B=1:3 to 1:100, preferably A:B=1:3 to 1:50, and more preferably A:B=1:5 to 1:30.

In the present step, the time period for immersing the polyester resin base and the polyvinyl alcohol resin layer in the dyeing solution is not particularly limited, and is in the range from, for example, 5 to 90 seconds, preferably 10 to 60 seconds, and more preferably 10 to 45 seconds. The temperature of the dyeing solution is in the range from, for example, 5° C. to 42° C., preferably 10° C. to 35° C., and more preferably 12° C. to 30° C.

In the present step, the dyeing treatment may be performed by applying or spraying the dyeing solution.

Either the stretching step or the dyeing step may be performed first, or they can be performed at the same time. Furthermore, when the manufacturing method includes a plurality of stretching steps as in the case where the aerial stretching step and the boric acid underwater stretching step are used in combination as described above, the dyeing step can be performed between the stretching steps. When the stretching step is aerial stretching, it is preferable to perform the dyeing step after the stretching step from the viewpoint of the orientation property of the dichroic substance, but the dyeing step may be performed before the stretching step. When the stretching step is underwater stretching, the dyeing step preferably is performed before the stretching step from the same viewpoint, but the dyeing step may be performed after the stretching step.

(4) Crystallization Step

After the dyeing step, the polyester resin base is crystallized. The crystallization treatment can be carried out by, for example, heating the polyester resin base and the polyvinyl alcohol resin layer that have undergone the dyeing step in an oven set at a predetermined temperature, with the stretching direction, or two directions consisting of the stretching direction and a direction orthogonal to the stretching direction of the polyester resin base and the polyvinyl alcohol resin layer being fixed. The heating can be carried out using an infrared (IR) heater, or may be achieved by contact heating using a heating roller or the like. The crystallization treatment temperature is as described above.

As described above, it is preferable that, in the present step, the crystallization is performed so that the degree of crystallinity of the polyester resin base, represented as a heat of fusion determined by DSC, is in the range from 25 to 45 mJ/mg. More preferably, the crystallization is performed so that the degree of crystallinity is in the range from 25 to 40 mJ/mg. By setting the degree of crystallinity to fall within the above range, it is possible to obtain a polarizing plate that has sufficient heat resistance and thus causes only a slight change in size even under high temperature.

As described above, by stretching the polyester resin base until the Δn becomes 0.03 or more in the above-described stretching step, it is possible to cause the polyester resin to form small crystals in the present step, thus lowering the haze value of the polyester resin base. Also, because the crystallization speed of the polyester resin is accelerated, for example, the polyester resin base can be crystallized at a low temperature of about 80° C. to 120° C., for example. The above-described haze value preferably is 1% or less. Stable stretching is achieved when the Δn of the polyester resin base is 0.25 or less.

As described above, in the method of manufacturing a polarizing plate according to the present invention, the present step is carried out after the dyeing step. Thus, according to the present invention, the polyvinyl alcohol resin layer is not crystallized, so that there is no risk that the dye-affinity etc. of the polarizing film may be deteriorated. Furthermore, according to the present invention, sufficient heat resistance of the polarizing plate can be achieved by using the crystallized polyester resin base as a protective layer as it is. Moreover, according to the present invention, it is not necessity to transfer or detach the polarizing film.

(5) Other Steps

The method of manufacturing a polarizing plate according to the present invention may further include any other step in addition to the above-described steps. Examples of the other steps include an insolubilizing step, a cross-linking step, a washing step, and a drying (moisture content-adjusting) step. These other steps each can be performed at any appropriate timing.

The insolubilizing step typically is carried out by immersing the polyvinyl alcohol resin layer in a boric acid aqueous solution. By the insolubilizing treatment, water resistance can be imparted to the polyvinyl alcohol resin layer. The concentration of boric acid in the boric acid aqueous solution in the insolubilizing step preferably is 1 to 4 parts by weight with respect to 100 parts by weight of water. The temperature of the solution (the boric acid aqueous solution) contained in an insolubilizing bath preferably is 20° C. to 50° C. The insolubilizing step preferably is performed after the manufacture of the laminate and before the dyeing step and the stretching step.

The cross-linking step typically is carried out by immersing the polyvinyl alcohol resin layer in a boric acid aqueous solution. By a cross-linking treatment, water resistance can be imparted to the polyvinyl alcohol resin layer. The concentration of boric acid in the boric acid aqueous solution in the cross-linking step preferably is 1 to 4 parts by weight with respect to 100 parts by weight of water. In the case where iodine was use as a dichroic substance in the above-described dyeing step and the cross-linking step is performed after the dyeing step, it is preferable to further add iodide to the boric acid aqueous solution. By adding iodide, it is possible to prevent the iodine adsorbed on the polyvinyl alcohol resin layer from being eluted. The amount of the iodide to be added preferably is 1 to 5 parts by weight with respect to 100 parts by weight of water. Specific examples of the iodide were as described above. The temperature of the solution (the boric acid aqueous solution) contained in a cross-linking bath preferably is 20° C. to 50° C.

The cross-linking treatment can be carried out by, for example, immersing the polyester resin base and the polyvinyl alcohol resin layer in a cross-linking solution containing a cross-linker.

The cross-linker can be a conventionally known substance, examples of which include boron compounds such as boric acid and borax. One of these compounds may be used alone, or two or more of them may be used in combination. As the cross-linking solution, a solution obtained by dissolving the cross-linker(s) in a solvent can be used. The solvent may be, for example, water, which optionally may further contain an organic solvent(s) compatible to water.

The concentration of the cross-linker in the solution is not particularly limited, and preferably is in the range from 0.1 to 10 parts by weight, more preferably from 1.5 to 8 parts by weight, and still more preferably from 2 to 6 parts by weight with respect to 100 parts by weight of the solvent (e.g., water), for example.

The cross-linking solution may contain, in addition to the boric acid compound, any of the following auxiliaries, for example: iodides such as potassium iodide, lithium iodide, sodium iodide, zinc iodide, aluminum iodide, lead iodide, copper iodide, barium iodide, calcium iodide, tin iodide, and titanium iodide. This is because the auxiliary allows the polarizing plate to have uniform in-plane properties. Among them, the combination of boric acid and potassium iodide is preferable. The content of the auxiliary in the solution is in the range from, for example, 0.05 to 15 wt %, preferably 0.5 to 8 wt %.

In the present step, the time period for immersing the polyester resin base and the polyvinyl alcohol resin layer in the cross-linking solution is not particularly limited, and is in the range from, for example, 5 to 150 seconds, preferably 10 to 90 seconds, and more preferably 20 to 40 seconds. The temperature of the cross-linking solution is in the range from, for example, 20° C. to 70° C., preferably from 40° C. to 60° C.

In the present step, the cross-linking treatment may be performed by applying or spraying the cross-linking solution. When underwater stretching is included as the stretching step, the cross-linking treatment preferably is performed before the underwater stretching.

The washing step typically is carried out by immersing the polyvinyl alcohol resin layer in a potassium iodide aqueous solution. The drying temperature in the drying step preferably is from 30° C. to 100° C.

(6) Polarizing Plate (a Laminate Including the Polarizing Film and the Polyester Resin Base)

Figure 1:
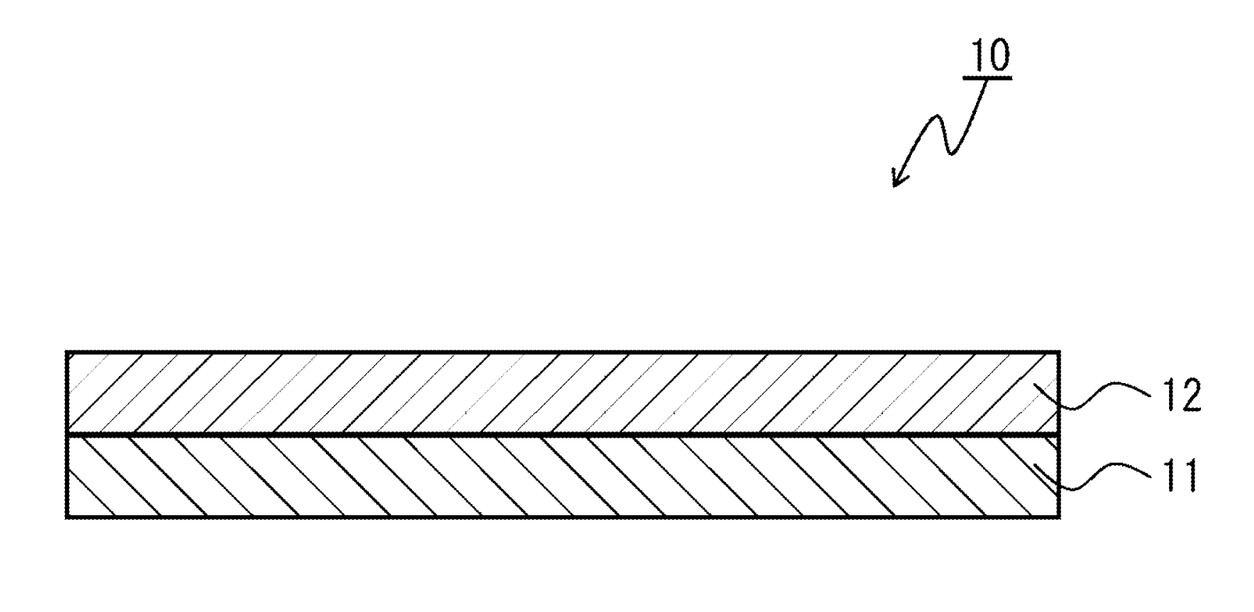
FIG. 1 is a sectional view showing an example the configuration of a polarizing plate obtained by the manufacturing method of the present invention.

FIG. 1 is a sectional view of an example of a polarizing plate obtained by the manufacturing method of the present invention. As shown in FIG. 1, in this polarizing plate 10, the polyvinyl alcohol resin layer 12 is laminated on one surface of the polyester resin base 11.

(7) Use

The polarizing plate obtained by the manufacturing method of the present invention can be used suitably in various image display devices such as a liquid crystal display (LCD) and an EL display. The liquid crystal display has the same configuration as conventional liquid crystal displays, except that it employs the polarizing plate obtained by the manufacturing method of the present invention. The liquid crystal display can be manufactured by, for example, assembling respective components including optical elements such as a liquid crystal cell and a polarizing plate obtained by the manufacturing method of the present invention, and optionally a lighting system (such as a backlight) as appropriate, and then incorporating a driving circuit.

The image display device is applicable to any suitable use. Examples of the use thereof include: office automation equipment such as desktop computers, notebook computers, and copy machines; portable devices such as mobile phones, watches, digital cameras, personal digital assistants (PDAs), and portable game devices; household electric appliances such as video cameras, televisions, and microwave ovens; vehicle-mounted devices such as back monitors, car navigation system monitors, and car audios; exhibition devices such as information monitors for commercial stores; security devices such as surveillance monitors; and nursing care and medical devices such as nursing-care monitors and medical monitors.

EXAMPLES

Next, examples of the present invention will be described together with comparative examples. It is to be noted, however, that the present invention is by no means limited by the following examples and comparative examples. Various physical properties and characteristics in the respective examples and comparative examples were evaluated or measured by the following methods.

(Orientation Property Δn of PET Base)

A PVA/PET laminate that had been stretched and dyed (and further crystallized) was immersed in water heated at 60° C. overnight to dissolve PVA. The thickness of the remaining PET base was measured with a dial gauge DG-205 manufactured by OZAKI MFG. CO., LTD. Thereafter, the orientation property Δn of the PET base at a wavelength of 590 nm was measured using "Axoscan (trade name)" manufactured by Axometrics.

(Size Change Ratio)

An acrylic pressure-sensitive adhesive was applied onto a PVA-side surface of the stretched and dyed (and further crystallized) PVA/PET laminate, and then the PVA-side surface was attached to a glass plate. The laminate in the state being attached to this glass plate was put in an oven at 80° C. for 250 hours, and the change in size of the laminate in the stretching direction was measured using a QVA-606 manufactured by Mitutoyo Corporation.

(Dye-Affinity)

The PVA/PET laminate was dyed by being immersed in a dye bath for each time period varied in the range from 5 and 120 seconds, and thereafter, the single transmittance of the PVA/PET laminate was measured using Dot-41 manufactured by Murakami Color Research Laboratory. The shortest immersion time where the single transmittance of 38% or less was obtained was determined.

(Degree of Crystallinity)

PVA was dissolved in the same manner as described in the section regarding the measurement of "Orientation property Δn of PET base". Using an EXSTAR DSC6220 manufactured by SII NanoTechnology Inc., the remaining PET base was heated from 30° C. to 300° C. at a temperature rising rate of 20° C./min and the heat of fusion at this time was measured.

(Glass Transition Temperature: Tg)

The glass transition temperature of the polyester resin base before being subjected to a lamination step was measured in accordance with JIS K 7121 using an EXSTAR DSC6220 manufactured by SII NanoTechnology Inc.

Example 1

(1) Lamination Step

PVA (JAPAN VAM & POVAL CO., LTD., trade name: "J40", 14 g) was dissolved in water (186 g) to obtain a PVA solution. Subsequently, the PVA solution was applied onto a polyester resin base (an unstretched film of amorphous PET (APET), 200 mm×200 mm, thickness: 200 μm) using an applicator, thus forming a polyvinyl alcohol resin layer. As the unstretched film of APET, a "NOVACLEAR SG-007 (trade name)" (Tg=80° C.) manufactured by Mitsubishi Plastics, Inc. was used. Then, the polyvinyl alcohol resin layer was dried at 70° C. for 5 minutes.

(2) Stretching Step

Next, using a tenter stretching machine, the polyester resin base and the polyvinyl alcohol resin layer were stretched in one direction at a stretch ratio of 4.5 times by aerial stretching at 100° C. The Δn of the polyester resin base after the stretching was 0.039.

(3) Dyeing Step

Next, the stretched PVA/PET laminate was immersed in a dye bath containing 97.6 wt % water, 0.3 wt % iodine, and 2.1 wt % potassium iodide at room temperature (23° C.). Then, the laminate was dried at 60° C. for 2 minutes. The time period for immersing the laminate was varied in the range from 5 to 120 seconds.

(4) Crystallization Step

Next, the polyester resin base and the polyvinyl alcohol resin layer were put in an oven at 90° C. for 1 minute to crystallize the polyester resin base.

Example 2

A polarizing plate was manufactured in the same manner as in Example 1, except that the crystallization treatment temperature was set at 120° C.

Example 3

A polarizing plate was manufactured in the same manner as in Example 1, except that "NOVACLEAR SI-026 (trade name)" (Tg=75° C.) manufactured by Mitsubishi Plastics, Inc. was used as the polyester resin base and that the crystallization treatment temperature was set at 100° C.

Example 4

A polyester resin ("PIFG5H (trade name)" (Tg=72° C.) manufactured by Bell Polyester Products, Inc.) was formed into a film shape by extrusion at 270° C. using a biaxial extruder, thus obtaining a film (thickness: 200 µm). A polarizing plate was manufactured in the same manner as in Example 1, except that the thus-obtained film was used as the polyester resin base and that the crystallization treatment temperature was set at 100° C.

Example 5

(1) Lamination Step

A lamination step was performed in the same manner as in Example 1.

(2) Stretching Step

Next, using a tenter stretching machine, the polyester resin base and the polyvinyl alcohol resin layer were stretched in one direction at a stretch ratio of 2 times by aerial stretching at 80° C.

(3) Dyeing (with Simultaneous Stretching) Step

Next, the stretched PVA/PET laminate was immersed in a dye bath (temperature: 60° C.) containing 97.6 wt % water, 0.3 wt % iodine, and 2.1 wt % potassium iodide. Then, in the dye bath, the laminate was stretched in a direction orthogonal to the stretching direction in the stretching step at a stretch ratio of 5 times. Thereafter, the laminate was dried at 60° C. for 2 minutes. The time period for immersing the laminate was set to 25 seconds. The $\Delta n$ of the polyester resin base after the stretching was 0.188.

(4) Crystallization Step

Next, the polyester resin base and the polyvinyl alcohol resin layer were put in an oven at 100° C. for 1 minute to crystallize the polyester resin base.

Example 6

(1) Lamination Step

A lamination step was performed in the same manner as in Example 1.

(2) Stretching Step

Next, using a roller stretching machine, the polyester resin base and the polyvinyl alcohol resin layer were stretched in one direction at a stretch ratio of 2 times by aerial stretching at 95° C.

(3) Dyeing (with Simultaneous Stretching) Step

Next, the stretched PVA/PET laminate was immersed in a dye bath (temperature: 63° C.) containing 97.6 wt % water, 0.3 wt % iodine, and 2.1 wt % potassium iodide. Then, in the dye bath, the laminate was stretched in the direction same as the above stretching direction at a stretch ratio of 3 times. Thereafter, the laminate was dried at 60° C. for 2 minutes. The time period for immersing the laminate was set to 20 seconds. The $\Delta n$ of the polyester resin base after the stretching was 0.16.

(4) Crystallization Step

Next, the polyester resin base and the polyvinyl alcohol resin layer were put in an oven at 100° C. for 1 minute to crystallize the polyester resin base.

Comparative Example 1

A polarizing plate was manufactured in the same manner as in Example 1, except that the crystallization step was not performed.

Comparative Example 2

A polarizing plate was manufactured in the same manner as in Example 1, except that the order of performing the dyeing step and the crystallization step was switched and that the crystallization treatment temperature was set at 160° C.

Comparative Example 3

A polarizing plate was manufactured in the same manner as in Example 5, except that the crystallization step was not performed.

Comparative Example 4

A polarizing plate was manufactured in the same manner as in Example 6, except that the crystallization step was not performed.

Table 1 below shows the kind of the polyester resin base used in each example and comparative example, the order of performing the dyeing step and the crystallization step, the $\Delta n$ of the polyester resin base after being stretched, conditions of the crystallization treatment, the degree of crystallinity, the dye-affinity, the size change ratio, and the haze.

TABLE 1

| | Polyester resin base | Order of performing steps | Δn | Conditions of crystallization treatment | Degree of crystallinity (mJ/mg) | Dye-affinity (sec) | Size change ratio (%) | Haze (%) |
|---|---|---|---|---|---|---|---|---|
| Ex. 1 | NOVACLEAR SG-007 | dyeing → crystallization | 0.039 | 90° C. - 1 min | 29.6 | 15 | −0.07 | 0.37 |
| Ex. 2 | NOVACLEAR SG-007 | dyeing → crystallization | 0.039 | 120° C. - 1 min | 34.6 | 17 | −0.05 | 0.87 |
| Ex. 3 | NOVACLEAR SI-026 | dyeing → crystallization | 0.074 | 100° C. - 1 min | 38.6 | 15 | −0.03 | 0.4 |
| Ex. 4 | PIFG5H | dyeing → crystallization | 0.063 | 100° C. - 1 min | 25.7 | 15 | −0.03 | 0.9 |
| Ex. 5 | NOVACLEAR SG-007 | stretching simultaneously with dyeing → crystallization | 0.188 | 100° C. - 1 min | 43.2 | 25* | −0.36 | 1 |
| Ex. 6 | NOVACLEAR SG-007 | stretching simultaneously with dyeing → crystallization | 0.16 | 100° C. - 1 min | 43.1 | 20* | −0.18 | 0.8 |
| Comp. Ex. 1 | NOVACLEAR SG-007 | dyeing only | 0.039 | — | 23.9 | 15 | −0.11 | 0.33 |
| Comp. Ex. 2 | NOVACLEAR SG-007 | crystallization → dyeing | 0.039 | 160° C. - 1 min | 34.3 | 110 | −0.03 | 1.2 |
| Comp. Ex. 3 | NOVACLEAR SG-007 | stretching simultaneously with dyeing | 0.188 | — | 39.7 | 25* | unmeasurable | 0.7 |
| Comp. Ex. 4 | NOVACLEAR SG-007 | stretching simultaneously with dyeing | 0.16 | — | 29.8 | 20* | unmeasurable | 0.5 |

*immersion time in dyeing bath (since dyeing and stretching were performed simultaneously, a separate dyeing step was not necessary)

As can be seen from Table 1 above, in Examples 1 to 6, the degree of crystallinity and the dye-affinity were high, and the size change ratio and the haze were small. In contrast, in Comparative Example 1 where the crystallization step was not performed, the degree of crystallinity was low and the size change ratio was large as compared with those in Examples 1 to 4 where the stretching was performed in the same manner. Furthermore, in Comparative Example 2 where the dyeing step was performed after the crystallization step, the dye-affinity was low and the haze was large. In Examples 5 and 6 where the dyeing step and the stretching step were performed at the same time in the dye bath, the size change ratio was slightly inferior to the case of the aerial stretching, but higher orientation of the polyester resin could be achieved. Moreover, since the stretching was performed at the same time with the dying in the dye bath, it was not necessary to perform dying and stretching as separate steps. In Comparative Examples 3 and 4, the obtained laminates shrank significantly and were partially separated from the glass sheets at the time of measuring the size change ratio. Thus, in Comparative Examples 3 and 4, the size change ratio could not be measured. In Comparative Example 3 and 4, the degree of crystallinity was high even though no crystallization treatment was performed. The reason for this is considered to be that, in the case of the underwater stretching (performed simultaneously with dyeing), the orientation property was made high because the stretching temperature was low, and when the base with a high orientation property was stretched, crystallization of the base was promoted. In the above-described examples, the size change ratio was higher when stretching simultaneously with dyeing was performed, as compared with the case where the aerial stretching was performed. The reason for this is considered to be as follows. In the above examples, the stretching temperature in the stretching simultaneously with dyeing was lower than the test condition temperature (80° C.) in the test of the size change ratio, whereas the stretching temperature in the aerial stretching was higher than the test condition temperature. When the test was performed at a temperature higher than the stretching temperature, the degree of relaxation of the orientation became high.

INDUSTRIAL APPLICABILITY

As described above, according to the present invention, it is possible to provide a method of manufacturing a polarizing plate having sufficient heat resistance without deteriorating the dye-affinity and the like of a polarizing film and without the necessity of transferring or detaching the polarizing film. There is no limitation on the use of the polarizing plate obtained by the present invention, and the polarizing plate is applicable to a wide range of fields

EXPLANATION OF REFERENCE NUMERALS

10: polarizing plate
11: polyester resin base
12: polyvinyl alcohol resin layer

The invention claimed is:
1. A method of manufacturing a polarizing plate that comprises a polyester resin base and a polarizing film comprising a polyvinyl alcohol resin laminated on the polyester resin base, the method comprising the steps of:
   stretching a laminate that comprises a polyvinyl alcohol resin layer laminated on the polyester resin base;
   dyeing the polyvinyl alcohol resin layer; and
   crystallizing the polyester resin base, wherein crystallization is performed at a temperature higher than the glass transition temperature of the polyester resin base,
   wherein the crystallization step is performed after the dyeing step, and
   wherein, in the crystallization step, the crystallization is performed so that the degree of crystallinity of the polyester resin base, represented as the heat of fusion determined by differential scanning calorimetry, is in the range from 25 to 45 mJ/mg.

2. The method according to claim 1, wherein, in the stretching step, the polyester resin base is stretched until the following orientation property Δn becomes 0.03 or more:

$$\Delta n = nx - ny$$

where nx denotes the refractive index in a direction in which a refractive index within a plane of the polyester resin base reaches its maximum, and ny denotes the refractive index in a direction orthogonal to the direction of the nx within the plane of the polyester resin base.

3. The method according to claim 1, wherein the temperature higher than the glass transition temperature is in the range from 80° C. to 120° C.

4. The method according to claim 1, wherein, in the crystallization step, the crystallization is performed so that the polyester resin base has a haze value of 1% or less.

5. The method according to claim 1, wherein the polyester resin base comprises a polyethylene terephthalate resin or a copolymer thereof.

6. The method according to claim 1, wherein the step of stretching comprises substeps of aerial auxiliary stretching and boric acid underwater stretching.

7. The method according to claim 6, wherein the step of dyeing occurs between the substeps of aerial auxiliary stretching and boric acid underwater stretching.

8. The method according to claim 1, wherein the heat of fusion is 25 to 40 mJ/mg.

9. The method according to claim 1, wherein the step of stretching is at a stretch ratio of at least 4 times.

10. The method according to claim 1, wherein the step of stretching is at a stretch ratio of at least 4.5 times.

11. The method according to claim 1, wherein the step of stretching is aerial stretching at a stretch temperature of 75° C. to 150° C.

12. The method according to claim 1, wherein the step of stretching is underwater stretching at a stretch temperature of 40° C. to 80° C.

13. The method according to claim 12, wherein the underwater stretching occurs in a stretch bath containing a boric acid aqueous solution.

14. The method according to claim 1, further comprising the step of insolubilizing the polyvinyl alcohol resin layer.

15. The method according to claim 1, further comprising the step of crosslinking the polyvinyl alcohol resin layer.

* * * * *